Sept. 5, 1967 E. F. KELM 3,340,492

ELECTRICAL CONTACT

Filed April 21, 1965

INVENTOR.
Everett F. Kelm

BY Charles W. Gregg

AGENT

United States Patent Office 3,340,492

Patented Sept. 5, 1967

3,340,492

ELECTRICAL CONTACT

Everett F. Kelm, Corning, N.Y., assignor to Corning Glass Works, Corning, N.Y., a corporation of New York Filed Apr. 21, 1965, Ser. No. 449,699
1 Claim. (Cl. 339—61)

The present invention relates to an electrical contact or electrical connection. More specifically the present invention relates to a device for making an improved electrical connection to an area of an electroconductive rigid surface. The invention is especially suitable for readily providing an electrical circuit connection to an electroconductive thin film deposited on a semi-rigid or rigid substrate.

In relatively recent years thin film electrically conducting coatings have come into considerable usage such as, for example, for the resistance elements in electric heating devices such as toasters, grills, space heaters etc. Such coatings may, for example, have a thickness ranging from the vicinity of only 700 Angstroms up to a thickness on the order of 60,000 Angstroms. In any event the coatings comprise a relatively thin film of electroconductive material deposited on a semi-rigid or rigid substrate such as a sheet of glass. Several examples of such coatings and a method of producing the same are described in Letters Patent of the United States 2,564,706, issued Aug. 21, 1951, to John M. Mochel and entitled, Coated Resistance.

One of the problems encountered in employing electrically conducting or electroconductive thin films or coatings in electrical circuits is the difficulty of readily making a good durable low resistance electrical connection or electrical contact with such films due to the thinness thereof. Also, such films being relatively thin, are readily subject to being worn through by the abrasive tendency of any electrical connection made by a relatively hard metallic electroconductive material disposed thereagainst and held in such position merely by pressure. Reliable solder electrical connections to such thin films are difficult and time consuming to make and, therefore, relatively expensive. It is, accordingly, one object of the present invention to provide a novel type of electrical contact which is especially suitable for use in making a pressure electrical connection to an electroconductive thin film deposited on a substantially rigid substrate.

It is another object of the present invention to provide an electrical contact which causes no or minimal abrasion of an electrically conductive thin film coating against which such contact is held by pressure, such contact providing, therefore, a minimum possibility of interruption of circuit continuity due to abrasion of said coating.

It is a third object of the invention to provide an electrical connection to an electroconductive thin film without the use of solder and which provides areal electrical connection to such film by means of pressure exerted between the contact and film.

It is still another object of the present invention to provide a novel type of pressure electrical contact which assures optimum electrical continuity in a circuit employing an electroconductive thin film.

It is a fifth object of the invention to provide an electrical contact which can be readily and rapidly employed for making an electrical connection to an electroconductive rigid surface.

In accomplishing the above objects of the invention there is provided a thickness of, or a pad or body of, compressible resilient material at least partially surrounded or enveloped by a thin deformable electroconductive foil which conforms to the contours of an electroconductive rigid surface when forcefully pressed thereagainst by spring means or other pressure imparting devices. Circuit connections to said foil can be made in any convenient manner.

Other objects and characteristic features of the invention will become apparent as the description proceeds.

The invention will best be understood with reference to the accompanying drawings in which.

Similar reference characters refer to similar parts in each of the figures of the drawings.

Figure 1:
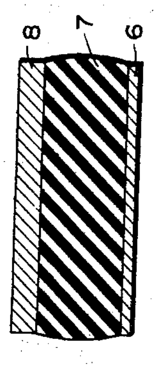
FIG. 1 is a cross-sectional view broadly illustrative of a basic unit embodying the invention, parts of such unit being on an exaggerated scale for purposes of facility of illustration and ready understanding thereof.

Referring to the drawings in detail, FIG. 1 illustrates a cross-section of a basic unit comprising a first member 6 formed of thin deformable electroconductive foil having disposed, against one surface thereof, one side or surface of a body or member 7 of a compressible resilient material. The surface or side of said body 7 opposite said one surface has disposed thereagainst a member 8 of a rigid material which acts as a rigid backing for the resilient member 7 and which may also be an electroconductive material if desired. Foil 6 may, for example, be silver, gold, platinum or copper foil etc. and is of a sufficient thinness so as to be readily deformable. Member 7 is illustrated as being rubber but may be made of any compressible material, such as for example asbestos, having sufficient resilience to cause coil 6 to substantially conform to the contours of a rigid surface against which such foil is pressed. The rigid member 8 is preferably formed of an electroconductive material such as nickel, stainless steel, copper, etc. but may, if desired, be made from an insulating material. If formed of an electroconductive material, member 8 may be employed as an electric bus bar as hereinafter further discussed.

In use, an electrical contact embodying a basic unit such as illustrated in FIG. 1 is disposed so that the exposed surface of member 6 rests against an area of the surface of an electro-conductive rigid surface such as a thin film deposited on a substrate. Pressure is then applied to member 8 so as to press said surface of member 6 tightly against said rigid surface and cause the foil, of which member 6 is made, to conform to the contours of the contacted area of the electroconductive rigid surface. As is apparent, the compressible resilient material of which the body or member 7 is formed permits and causes the foil of member 6 to closely conform to said contours. Electrical connections may be made to member 6 in any convenient manner and, if member 8 is made of an electroconductive material, such member may be electrically connected to member 6 and member 8 then employed as an electrical bus bar, as previously mentioned.

Figure 4:
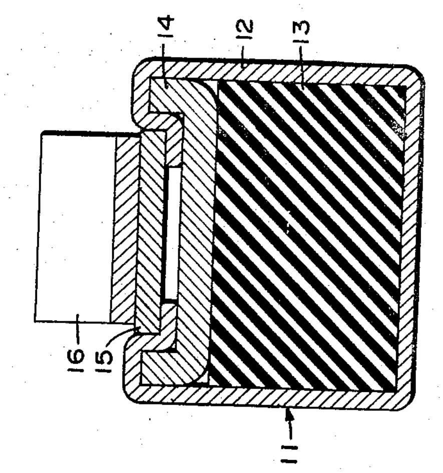
FIG. 4 is a cross-section of the contact illustrated in FIGS. 2 and 3, taken generally along the line 4—4 of FIG. 2.
Figure 3:
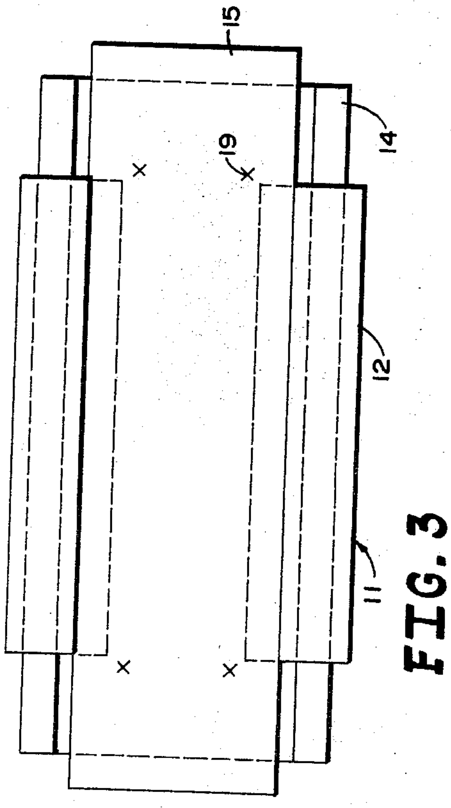
FIG. 3 is a plan view of the contact shown in FIG. 2.
Figure 2:
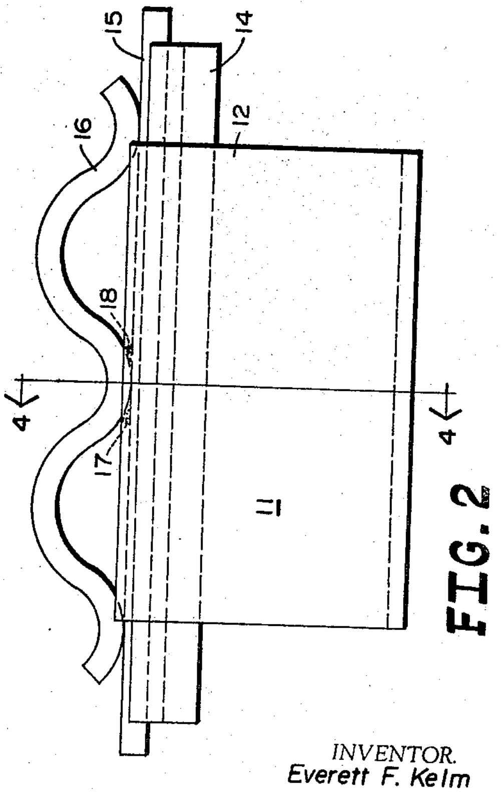
FIG. 2 is a side elevational view of a preferred embodiment of an electrical contact incorporating the invention, parts of such contact also being on an exaggerated scale.

Referring to FIGS. 2, 3 and 4 of the drawings, there is illustrated an electrical contact 11 in accordance with the invention and comprising a channel shaped member 12 formed of a thin deformable electroconductive foil partially surrounding or enveloping a pad or thickness 13 (FIG. 4) of a suitable compressible resilient material illustrated as rubber but which, as previously mentioned, may be formed of any suitable compressible resilient material. The upper ends of the foil of the channel shaped member 12 are folded over the sides of a second, but smaller and rigid, channel shaped member 14, and extend across at least a part of the inner bottom surface of such member 14 (FIG. 4). A rigid member 15, preferably but not necessarily, comprising an electrically conductive material, is pressed into the space in the channel between the sides of member 14 and tightly clamps said upper ends of the foil of member 12 within such channel while making a tight physical contact therewith. If desired to assure electrical circuit continuity between member 15 and the foil of member 12, when member 15 is made of a suitable metal, soldered connections therebetween may be provided adjacent the edges of member 15 contacting such foil. Also to assure the retention of member 15 in its above-described foil clamping position within the channel of member 14, member 15, if made of metal, may be spot welded or soldered to member 14 at each point, such as 19, indicated in FIG. 3 by the letter X.

A curved leaf spring 16 (FIGS. 2 and 4) is shown disposed against the exposed surface of member 15 and, if member 15 is metallic, spring 16 may be made a permanent part of electrical contact 11 by soldering or welding such spring to member 15 at points, for example, indicated by the reference characters 17 and 18. However, a spring such as 16 may, if desired, be removably employed by relying on the resiliently thereof to maintain it in its desired position. Spring 16 may, of course, have configurations other than that illustrated since the main consideration in the provision of such spring is only that, when flexed, it can supply sufficient pressure against member 15 and, thereby, to pad 13 to resiliently compress the material of such pad and cause the foil of member 12 to conform to the contours of an area of an electroconductive rigid surface against which such foil is disposed.

Electric circuit connections to contact 11 may be made in any convenient manner such as, for example, by soldering or clamping an electrical circuit lead to member 15, when such member comprises an electroconductive material, or by soldering an electrical circuit lead directly to member 12. An electrical circuit connection to spring 16 can be used when such spring and member 15 comprise electroconductive materials.

As is believed obvious, an electrical contact, such as contact 11 illustrated in FIGS. 2, 3 and 4, is employed in a manner similar to that previously discussed in relation to a basic unit such as illustrated in FIG. 1 and, therefore, no detailed discussion of the use of such contact is considered necessary.

Although there is herein shown and described in detail only a single specific example of an electrical contact embodying the invention, it will be understood that various changes and modifications may be made therein without departing from the spirit and scope of the appended claim.

What is claimed is:

An electrical contact comprising, a flat bottom channel of deformable electroconductive foil, a piece of compressible resilient material disposed within the channel of said foil, a rigid bus bar disposed over said material and having electrical connections with said foil, and compressible spring means mounted on said bus bar to apply pressure to the exposed bottom surface of said foil when such surface is placed in contact with a rigid electroconductive surface and such spring means is compressed.

References Cited

UNITED STATES PATENTS

| | | | |
|---|---|---|---|
| 2,298,236 | 10/1942 | Siegmund. | |
| 2,663,844 | 12/1953 | Earle et al. | 339—61 |
| 2,858,516 | 10/1958 | Lindahl et al. | 339—263 |
| 2,861,168 | 11/1958 | Knoll | 339—252 |
| 2,914,212 | 11/1959 | Fino | 174—35.2 |
| 2,912,746 | 11/1959 | Oshry et al. | 29—155.5 |
| 2,912,747 | 11/1959 | Oshry et al. | 29—155.5 |
| 3,041,574 | 6/1962 | Cornell | 339—363 |

FOREIGN PATENTS

| | | |
|---|---|---|
| 890,077 | 9/1953 | Germany. |

MARVIN A. CHAMPION, *Primary Examiner.*

EDWARD C. ALLEN, *Examiner.*

P. TEITELBAUM, *Assistant Examiner.*